US00RE33930E

United States Patent [19]

Ardent

[11] E Patent Number: Re. 33,930

[45] Reissued Date of Patent: May 19, 1992

[54] ADJUSTABLE SUPPORT SYSTEM FOR MARINE CRAFT

[76] Inventor: John C. Ardent, 840 Wedgewood Dr., Pittsburg, Calif. 94565

[21] Appl. No.: 628,717

[22] Filed: Dec. 10, 1990

Related U.S. Patent Documents

Reissue of:

[64] Patent No.: 4,792,130
Issued: Dec. 20, 1988
Appl. No.: 2,946
Filed: Jan. 13, 1987

U.S. Applications:

[63] Continuation-in-part of Ser. No. 852,579, Apr. 16, 1986, abandoned, which is a continuation of Ser. No. 638,254, Aug. 6, 1984, abandoned.

[51] Int. Cl.[5] ..... B23Q 3/00
[52] U.S. Cl. ..... 269/296; 269/901
[58] Field of Search ..... 269/69, 296, 17, 901; 114/44–46; 405/7; 182/151, 181, 224; 248/454.5, 188.8; 280/414.1

[56] References Cited

U.S. PATENT DOCUMENTS

| | | | |
|---|---|---|---|
| 418,938 | 1/1890 | Bogusch et al. | 182/181 |
| 3,139,277 | 6/1964 | Mears | 405/7 |
| 3,347,543 | 10/1967 | Zak | 269/296 |
| 3,383,080 | 5/1968 | Frisbie | 248/354.5 |
| 3,586,285 | 6/1971 | Modzelewski | 405/7 |
| 3,938,668 | 2/1976 | Konstant | 248/188.8 |
| 4,155,667 | 5/1979 | Ebsen | 405/7 |
| 4,383,681 | 5/1983 | Walters | 269/296 |
| 4,392,627 | 7/1983 | van den Broek | 269/296 |
| 4,457,399 | 7/1984 | Breisch | 182/151 |
| 4,468,150 | 8/1984 | Price | 269/296 |

*Primary Examiner*—Robert C. Watson
*Attorney, Agent, or Firm*—Limbach & Limbach

[57] ABSTRACT

Systems are provided to support marine craft comprising a plurality of support apparatus. Each support apparatus is comprised of a surface for contact with the marine craft, an extension member which is fastened at one end to a base and connected pivotably at its other end to the surface, and the base. The base provides means for fixedly engaging and retaining the extension member at a given orientation. The base is attached to the extension member at its end remote from the end which is connected to the surface. In additon, the base provides means for adjustably connecting the base to adjacent bases, which in turn engage adjacent extension members. The plurality of support apparatus are arranged such that a marine craft which contacts the surfaces of the support device is supported in a stationary position.

10 Claims, 2 Drawing Sheets

ADJUSTABLE SUPPORT SYSTEM FOR MARINE CRAFT

Matter enclosed in heavy brackets [ ] appears in the original patent but forms no part of this reissue specification; matter printed in italics indicates the additions made by reissue.

RELATED APPLICATION DATA

The present application is a continuation-in-part of commonly owned and co-pending application Ser. No. 852,579 filed on Apr. 16, 1986, now abandoned, which in turn was a continuation of commonly owned and copending application Ser. No. 638,254 filed on Aug. 6, 1984, now abandoned.

TECHNICAL FIELD

This invention generally relates to support systems for marine craft and more particularly to a system which is capable of being adjusted to accommodate and support marine craft of different sizes.

BACKGROUND ART

Previously, there have been numerous devices employed to support marine craft when the craft are not in water. Such support is necessary when the marine craft is, for example, undergoing extensive repair or on display at a trade show.

Conventional support devices for marine craft have included bracing the craft with barrels and blocks of wood, trailers and custom-made stand individually designed and fitted for each application. However, these devices, when they have the flexibility to adapt to various sizes of marine craft, generally provide inadequate support. Devices which provide adequate support are normally non-adjustable or are not portable.

A further problem with non-adjustable marine craft supports is the complexity inherent in constructing a complete device while maintaining a precise relationship between all the components. The various beams and braces must be maintained in precise alignment while being rigidly attached. In the event of severe damage, the entire support must be reconstructed or renewed as a unit. It would be advantageous to construct a support device which utilizes modular elements, thus simplifying construction and repair techniques.

Other prior art included marine support structures which incorporated an interdependent cross-braced system of tie rods as disclosed in Mears, U.S. Pat. No. 3,139,277, issued June 30, 1964. These interdependent cross-braced ties were necessary to the overall operation and rigidity of the storage unit structure.

Conventional craft supports also took the form of bases which could only be adjusted in two directions; outwardly so as to accommodate a wide hulled craft, and vertically or longitudinally so a to be comparible with the keel depth. A representative example of this type of support is taught by Ebsen, U.S. Pat. No. 4,155,667, issued May 22, 1979. These supports lacked a great range of adjustability, as they were a four base support design for use on small craft. Additional bases could not be added so that a larger craft could be supported.

Similar support devices for marine craft are disclosed in Zak, U.S. Pat. No. 3,347,543, issued Oct. 17, 1967; and Modzelewski, U.S. Pat. No. 3,586,285, issued June 22, 1971.

It is therefore an object of present invention to provide a support system which can be adapted to marine craft of different dimensions and shapes.

Another object of the present invention is to provide a support system which can adapt to marine craft of various sizes through the adjustment or replacement of readily available segments.

Yet another object of the present invention is to provide a support system which is lightweight yet provides sufficient support for large marine craft.

A further object of the present invention is to provide a support system which employs a small number of separate elements required for its construction.

DISCLOSURE OF THE INVENTION

The foregoing objects and advantages of the present invention are apparent from the ensuing disclosure, in which a preferred embodiment is illustrated in the accompanying drawings. It is contemplated that variations in structural features and arrangements of parts thereof may occur to the skilled craftsman without departing from the spirit of the present invention and without exceeding the scope of the appended claims.

The present invention provides a system to support marine craft comprising a plurality of support apparatus. Each support apparatus is comprised of a surface for contacting the marine craft, an extension member which is extendably fastened at one end to a base and pivotably connected at its other end to the surface, and the base. The base attaches to the extension member at the member's end remote from the end which is connected to the surface. The base fixedly engages and retains the extension member at a given orientation and provides means for adjustably connecting the base to adjacent bases, which in turn at least engages the opposing adjacent extension members. The plurality of support apparatus are arranged so that a marine craft which contacts the surfaces of the support system is supported in a stationary position.

BEST MODE FOR CARRYING OUT THE INVENTION

The present invention provides an improved system for stationary terrestrial support of marine craft. The system is capable of supporting a variety of marine craft having different dimensions and shapes through various adjustable features of the device. The system will be described in detail by reference to the drawings.

Figures 1, 2, 3:
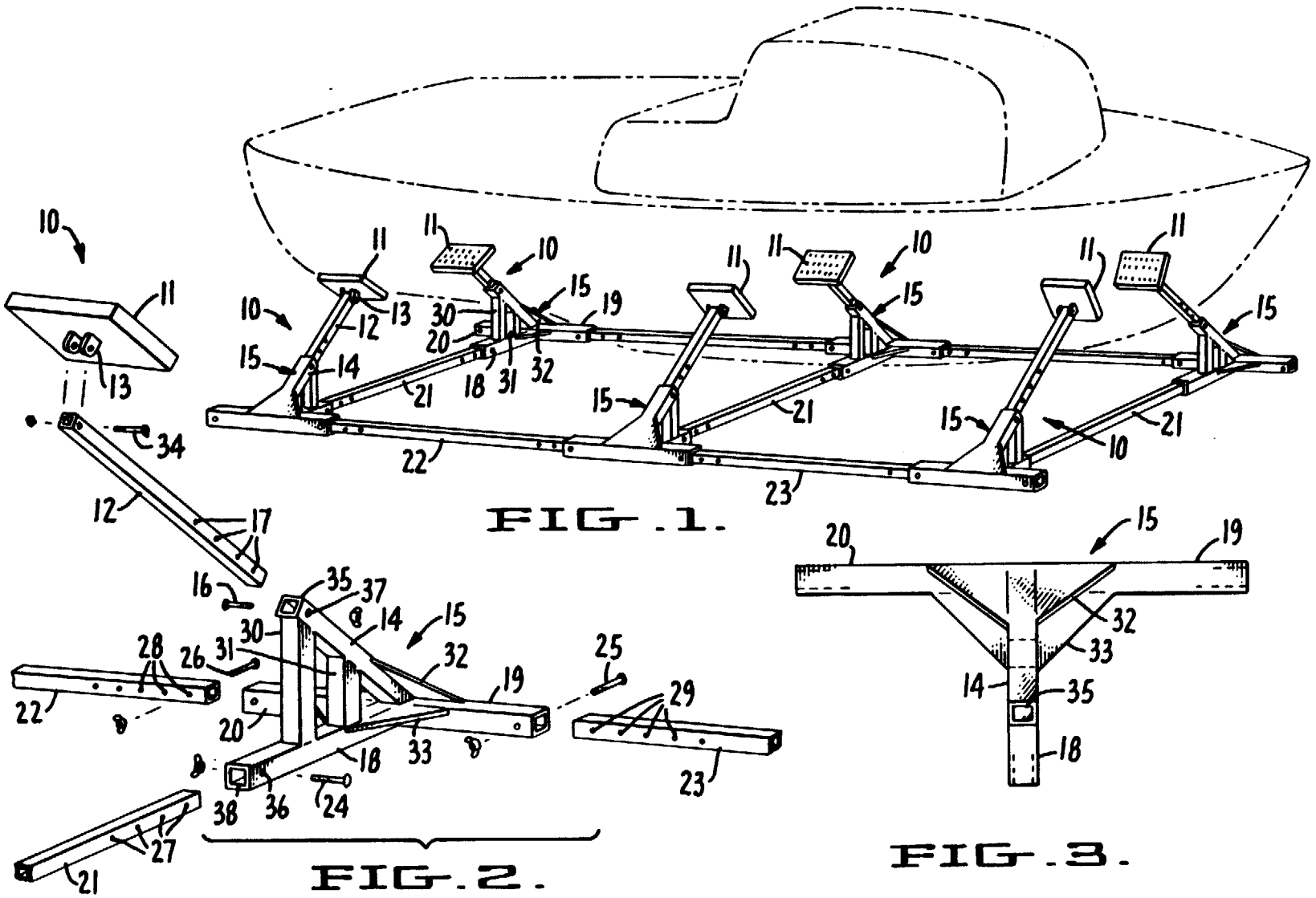
FIG. 1 is a perspective view, with a marine craft shown in phantom lines, of a preferred embodiment of the present invention.
FIG. 2 is an exploded perspective view of a support apparatss and struts with portions broken away, in accordance with the present invention.
FIG. 3 is a top plan view of a preferred embodiment of a support apparatus of the present invention.

Referring to FIG. 2, a preferred embodiment of one component of the present invention is shown. FIG. 2 depicts the support apparatus 10 which is configured to contact the outer surface of the hull of the supported marine craft and in cooperation with other support apparatus of the system, transmit the weight of this craft to the ground. In general, the support apparats comprises a surface portion for contacting the hull of the marine craft, a base for contacting the ground and a means for separating these components by a pre-determined distance. The support apparatus 10 is preferably made of some rigid or semi-rigid material, such as metal, plastic or wood.

Contact surface 11 is shown to be pivotably connected to extension member 12 by means of a bracket 13 and pivot pin 34 which pin provides an axis of rotation. Although surface 11 is shown having a rectangular shape with certain dimensions of width, length and thickness, the shape and precise dimensions of the surface are only one of many alternative embodiments. The surface of the present invention is adaptable to numerous shapes and dimensions including circular, triangular, and rectangular shapes and varying thicknesses. The surface can, if desired, be padded with materials such as carpeting, rubber, or foam to cushion the hull of the marine craft. Alternatively, the entire surface can be constructed from resilient material. In addition, the surface can b smooth, or in the alternative, textured to provide increased friction between the surface and the hull of the marine craft.

The pivotable connection between surface 11 and extension member 12 can be accomplished by various means, such as, for example, the pivot pin 34 and bracket 13 depicted. Alternatively, e.g., a ball and socket joint can provide the desired freedom of movement. The pivotable connection between surface 11 and extension member 12 provides improved contact between the hull of the marine craft and the surface. The system can support marine craft of various hull shapes and, widths, in part because the weight of the marine craft will cause the surface to rotate around its axis of attachment, e.g., the center-line of pin 34.

Separating surface 11 from base 15 is an extension member 12. The extension member 12 transmits the force applied to surface 11 by the weight of the marine craft to the base 15 which is desirably positioned on a surface which does not yield under this force. The extension member also provides means for adjusting the distance between surface 11 and base 15 so that, as depicted in FIG. 1, a system comprising separate support apparatus can accommodate marine craft having different hull dimensions and shapes.

Extension member 12 is longitudinally adjustably connected to receptacle member 14 of base 15 at the end remote from the end pivotably connected to surface 11. In FIG. 2 this longitudinally adjustable feature is shown as a means of telescoping engagement between the receptacle member 14 and extension member 12. In a preferred embodiment, the extension member 12 is inserted into channel 35 and reversibly fixed to receptacle member 14 by a pin 16 inserted through a channel 37 in receptacle member 14 and through one of the aligned channels 17, which are provided in extension member 12. The adjustability of this distance is an important aspect of the present invention, in part because it enables the present invention to support maine craft with hulls of various sizes. In addition, by adjusting the extension members on one side of the marine craft, this feature provides means for controlling the angle of tilt at which the marine craft is to be supported relative to the ground. Adjustability of the base distance between surface 11 and base 55 can be accomplished by mechanisms other than a telescoping engagement between extension member 12 and receptacle member 14, such as, a sliding channel system, a tongue-in-groove arrangement, or employing interchangeability with extension members of different lengths. In addition, the depicted means of adjustment can be used with, or replaced by, a means of continuous adjustment as described below.

Base 15 provides structural support for extension member 12 and provides a means to transfer the weight of the marine craft from the surface 11 to the ground. Base 15 is T-shaped and comprises receptacle member 14 which adjustably engages and retains extension member 12 a a given orientation. Although FIG. 2 shows receptacle member 14 of base 15 fixed at approximately a 45 degree angle in relation to the plane of the surface on which the base is positioned, the receptacle member 14 can be fixed at a variety of angles Alternatively, an adjustment feature can be provided to adapt the angle to a desired angle. In applications where the relative positions of the various members of base 15 are fixed, the apparatus can be strengthened by, e.g., gussets 32 and 33 as shown in FIG. 3.

Base 15 further includes a plurality of base members, 18, 19, and 20. Each of these base members can engage with struts 21, 22 and 23, shown as a telescoping engagement between the base member and the strut. For example, strut 21 is inserted into channel 38 and reversibly fixed to base member 18 by pin 24 inserted through channel 36 in base member 18 and through aligned channel 27 provided in strut 21 in a manner substantially similar to the engagement of the extension member 12 previously described. The remaining base members 19 and 20 of base 15 are similarly capable of being attached to struts 22 and 23 by means of a telescoping engagement between the base member and the strut in the manner previously described for base member 18 and strut 21. As previously described, the adjustable connection between the base members of base 15 and the struts can be accomplished by a variety of alternative methods such as a sliding channel system, tongue-in-groove arrangement, or the replacement of a chosen strut with struts of various lengths.

The base members of base 15 provide means for connecting base 15 to a plurality of adjacent and opposing bases, as seen in FIG. 1, thereby forming a system for supporting marine craft, as described in further detail below. By opposing bases it is intended to include bases positioned on opposite sides of the plane of symmetry of the marine craft hull. Generally this plane will be located vertically through the centerline of the hull and the marine craft's center of gravity. More particularly, opposing bases are taken to mean bases which are positioned directly opposite each other, and which oppose any horizontal motion of the hull which may be induced by the support position of the paired opposing base. Adjacent bases are taken to mean bases which are positioned on the same side of the aforementioned plane of symmetry. It will be readily apparent that is not necessary taat a base be longitudinally connected to adjacent bases in order for the support system to function in the described manner.

The adjustability of the connection between the base member and strut allows variable positioning of the support apparatus in relation to other support apparatus in order that marine craft of different dimensions and shapes can be accommodated by a system comprising a plurality of apparatus. An alternative embodiment of the present invention contemplates using struts of various lengths to accomplish the positioning of the support apparats of the present invention.

Base 15 further comprises a plurality of brace members 30 and 31 to provide means for retaining receptacle member 14 at a selected orientation relative to the remainder of the base. In the embodiment illustrated in FIG. 2, each brace member is attached at one end to base member 18 and at its other end to receptacle member 14. Other embodiments of the present invention include attachment of the [base] *brace* members at one of their ends to any base member of base 15. Additionally, the brace members can be replaced by a triangular support feature without departing from the scope of the invention, while the number and length of the brace members can be altered to, e.g., change the angle at which the receptacle member 14 is fixed and to provide means for fixedly engaging the receptacle member. In addition, brace members 30 and 31 can be replaced by, for example, a hydraulic lifting device By providing a pivotal connection between receptacle member 14 and the base members, an adjustable angle of orientation can be provided for the receptacle member.

Figure 4:
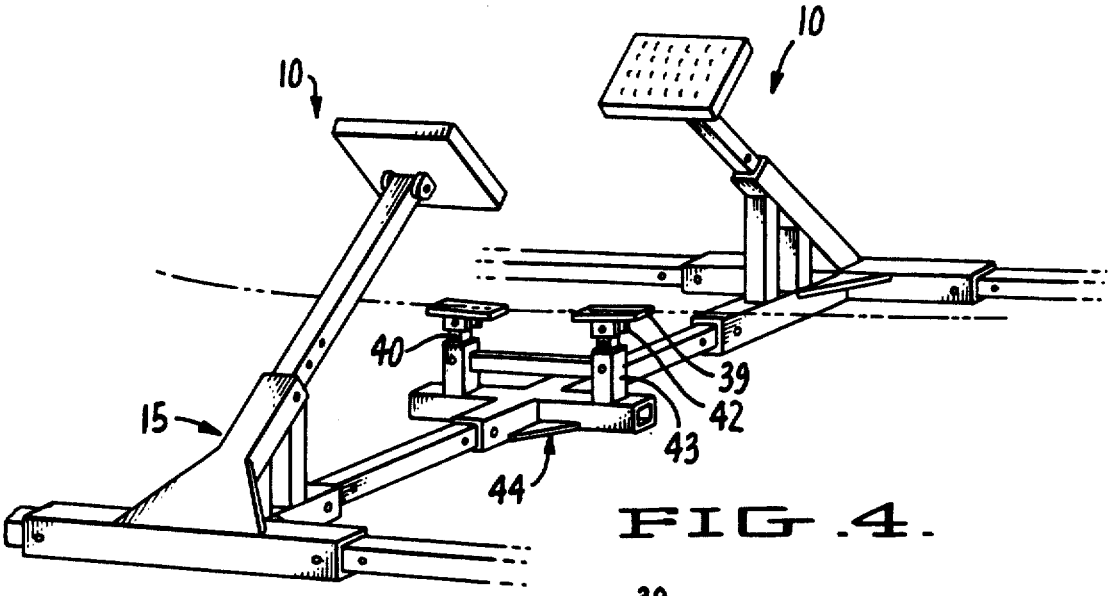
FIG. 4 is a perspective view, with the keel of a marine craft and the remainder of the support device shown in phantom line, of an optional keel support apparatus of the present invention.
Figure 5:
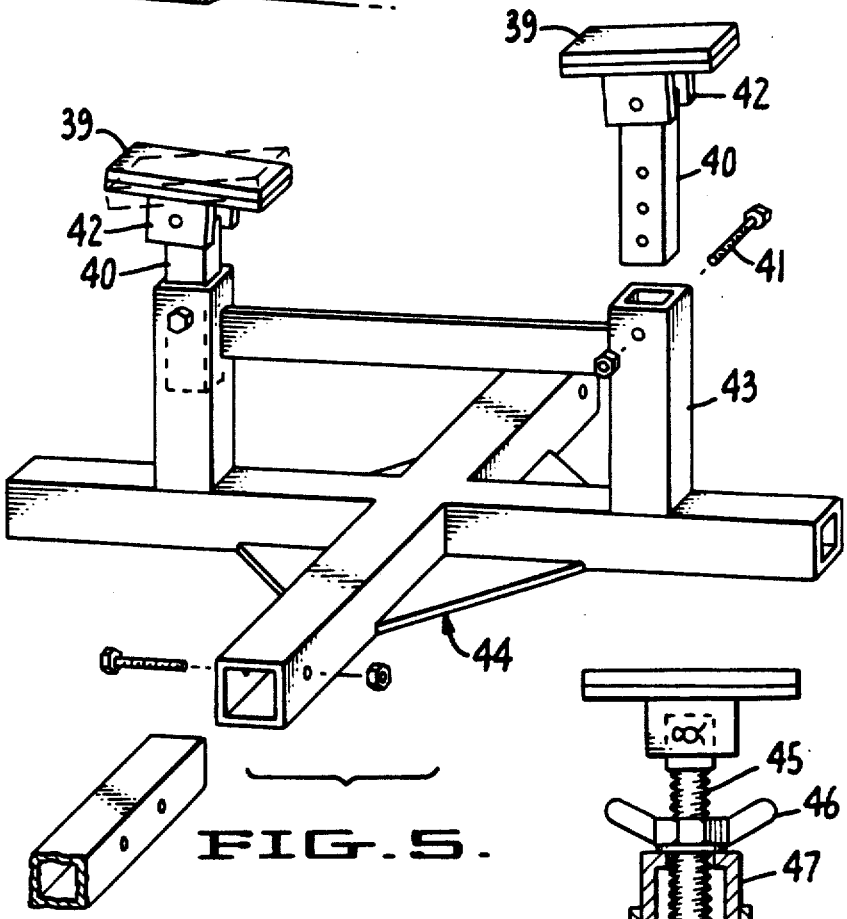
FIG. 5 is an exploded perspective view of the keel support apparatus of FIG. 4.

FIGS. 4 and 5 disclose an optional keel support apparatus which is desirably provided as a feature of the support system of the present invention. The construction details of a preferred embodiment of this keel support apparatus are in general analogous to the details previously described for a representative support apparatus, such as portrayed in FIG. 2. In the portrayed embodiment, at least one surface 39 is provided for contacting the keel of the marine craft. This surface is pivotably mounted on an extension member 40 by, e.g., a pivot pin 41 and bracket 42 arrangement. The extension member 40 can be fitted into a receptacle member 43 in a manner similar to the extension member 12 and receptacle member 14 previously described. The base 44 of the keel support apparatus is shown in conformation which allows the keel support apparatus to be mounted on one of the struts which passes beneath the keel of the marine craft, such as strut 21 in FIG. 1. If desired, a means for reversibly fixing the keel support apparatus to the strut can be provided, e.g., the pin and aligned channel means disclosed in FIG. 5. Base 44 is desirably configured so that the keel can rest on surface 39 perpendicular to the axis of pivot pin 41, or alternatively parallel to this axis. In this manner, an essentially flat keel can be braced with the pivot axis perpendicular, whereas in certain applications it is considered desirable to have surface 39 contact the surface of the keel in a manner analogous to the contact of surface 10 with the hull of the marine craft. This feature would be desirable where the keel has a broad cross-section or an irregular profile.

Figure 6:
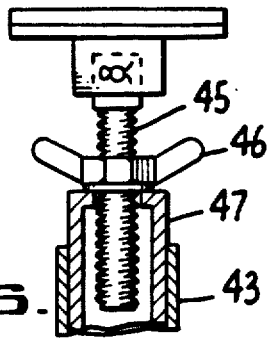
FIG. 6 is a side elevation, with portions in vertical section, of a continuously adjustable extension means for contact surfaces of the present invention.

FIG. 6 portrays an additional aspect of the present support system whereby various adjustable features of the system can be provided with a means for continuous length adjustment in addition to or as an alternative to the pins and aligned channels previously disclosed. In this embodiment, length adjustment is obtained by the screw 45 and nut 46 where rotation of the nut changes the amount of screw protruding from the member 47. The construction of such a continuous extension means is considered to be routine for one having ordinary skill in the art to which the present invention pertains.

FIG. 1 shows a perspective view of the present invention in a preferred embodiment This embodiment shows a system comprising a plurality of support apparatus, each with means for adjustably connecting the base of the given apparatus to adjacent bases which in turn engage adjacent extension members. The plurality of support apparatus shown in FIG. 1 are arranged such that a marine craft which contacts the surface of each support apparatus is held in a stationary position. The construction of the present invention is such that, by adjusting the distance between the surface and base of selected support apparatus, the marine craft's angle of tilt can be varied either in a horizontal or vertical direction. The weight of the marine craft itself will cause the surface to pivot and stabilize at an angle at which the marine craft's hull will make firm contact with the surface.

While the embodiment shown in FIG. 1 comprises six support apparatus, it should be obvious to a skilled practitioner that as few as two support apparatus can be used as a cooperative system to practice the present invention.

However, while a system comprising two support apparatus may be useful for marine craft of relatively short length, the invention generally comprises three or more support apparatus. These apparatus will be arranged about the hull such that any tendency toward lateral movement of the marine craft induced by support apparatus on one side of the marine craft's hull will be counteracted by pressure from opposing support apparatus.

In the presently preferred embodiment, the system of adjacent and opposing bases will be arranged such that opposing bases are positioned directly opposite each other, and thereby directly oppose any horizontal motion of the hull which may be induced by the support position of the paired opposing base, as can be seen in FIG. 1. In addition, while not required for the practice of this invention, it will often be found useful to connect adjacent bases, as described previously, thereby increasing the overall rigidity of the support system. The system of the present invention provides secure support for marine craft when it is necessary that the craft be positioned on land.

While FIG. 1 depicts a plurality of support apparatus equidistantly positioned from one another with an equal number of support apparatus on each side of the marine craft's hull, other embodiments of the present invention can include support apparatus placed non-equidistantly from one another, with unequal numbers of support apparatus on either side of the marine craft's hull. In additio, further benefits can be obtained by including in the system a keel support apparatus in the manner previously described.

Although the foregoing invention has been described in some detail by way of illustration and example, for purposes of clarity of understanding, it will be obvious to one skill in the art that certain modifications may be practiced within the scope of the attended claims.

I claim:

1. A system to support marine craft comprising a plurality of support apparatus each in turn comprising:

(a) an essentially flat surface pad member for contact with the hull of the marine craft;

(b) a longitudinally adjustable extension member, said extension member being adjustably engaged at one end to a T-shaped base and connected pivotally at the other end to the surface pad member; and (c) said T-shaped base in turn comprising:

(i) a *plurality of base members defining the plane of the T-shaped base*, (*ii*) *a* receptacle member disposed at an acute angle relative to the plane of the T-shaped base which telescopically engages said extension member at the end of said extension member remote from the end pivotally connected to said surface pad member, and characterized as fixedly engaging and retaining said extension member at a given orientation;

[(ii)] (*iii*) at least one strut capable of engaging with at least [an] *one* opposing T-shaped base; and

[(iii)] (*iv*) at least one brace member [vertically] disposed between [said strut] *at least one base member of said T-shaped base* and said receptacle member, said brace *member* being capable of [bearing vertical loads,] fixedly engaging and supporting said receptacle member, said plurality of support apparatus arranged such that *a* marine craft which contacts the surfaces of said support [device] *system* is supported in a stationary manner.

2. A system to support marine craft as recited in claim 1, comprising three or more substantially similar support appparatus.

3. A system to support marine craft as recited in claim 1, wherein said base can be adjustably connected to adjacent bases by means of struts, which are inserted into channels in each leg of said T-shaped base.

4. A system to support marine craft as recited in claim 3, wherein a telescoping engagement between said strut and said base provides means for adjustably connecting said base to adjacent bases.

5. A system to support marine craft as recited in claim 1, wherein the distance between said surface pad member and said base is adjustable.

6. A system to support marine craft as recited in claim 1, further comprising at least one keel support apparatus in weight bearing relationship to said marine craft being engaged to a strut member which connects opposing T-shaped bases.

7. A system to support marine craft as recited in claim 1, wherein said base further comprises:

(a) three base members, each of which are capable of attaching by means of a telescoping engagement to a strut; and (b) one receptacle member which is capable of accepting and attaching to said extension member.

8. A system to support marine craft as recited in claim 6 wherein said keel support apparatus comprising an essentially flat surface pad member being pivotally connected to an extension member which adjustably engages a receptacle member.

*9. A system to support marine craft as recited in claim 1, wherein said brace member is vertically disposed between said base member and said receptacle member, said brace member being capable of bearing vertical loads, fixedly engaging and supporting said receptacle member.*

*10. A system to support marine craft as recited in claim 1, wherein said brace member is attached at one end to said receptacle member and at the end remote from said receptacle member to said base member, said brace member providing means for fixedly engaging and retaining said receptacle member at an acute angle relative to the plane of said T-shaped base.*

* * * * *